L. YEAGER, Jr.
CAR STEP.
APPLICATION FILED AUG. 21, 1908.
919,278.
Patented Apr. 20, 1909.
2 SHEETS—SHEET 1.
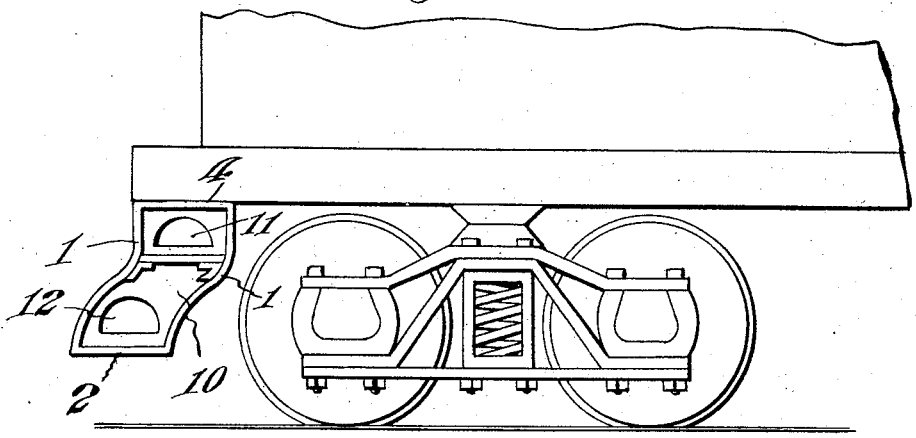
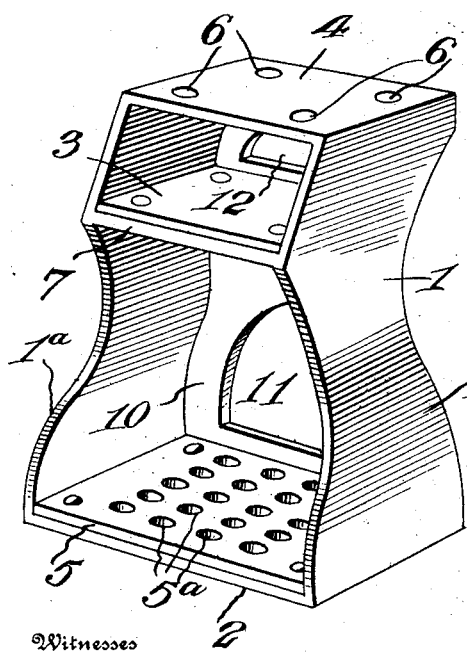
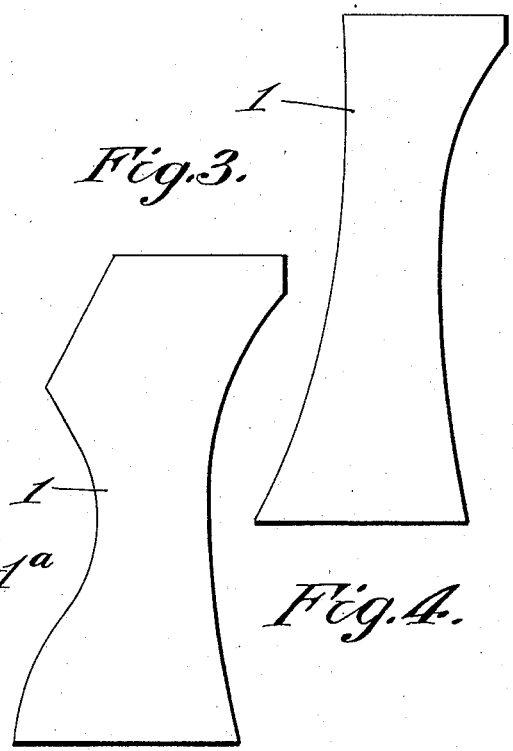
Witnesses
Joe. P. Wahler.
John F. Byrne.
Inventor,
Lloyd Yeager, Jr.
By Victor J. Evans,
Attorney L. YEAGER, Jr.
CAR STEP.
APPLICATION FILED AUG. 21, 1908.
919,278.
Patented Apr. 20, 1909.
2 SHEETS—SHEET 2.
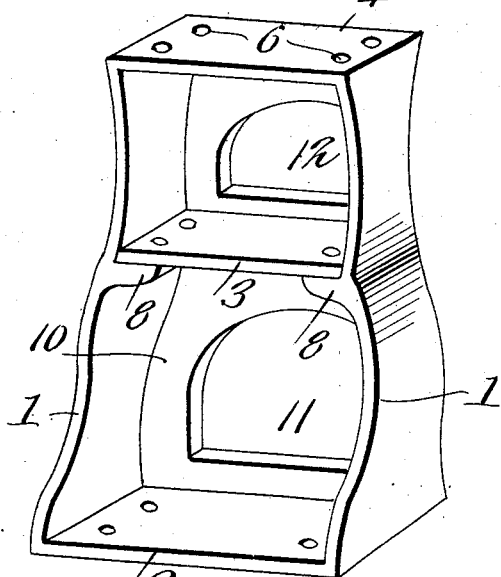
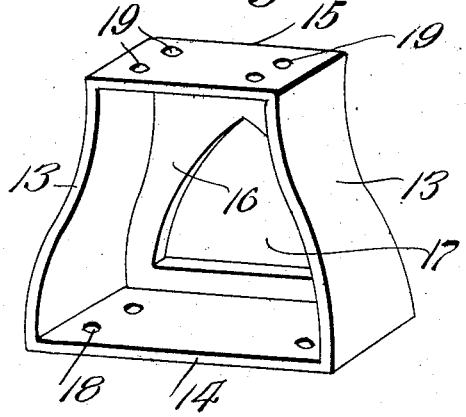
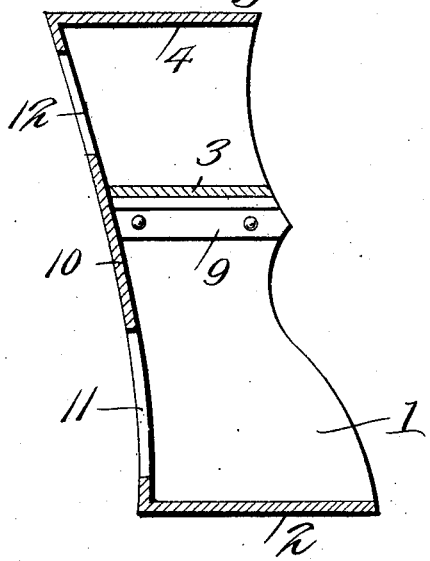
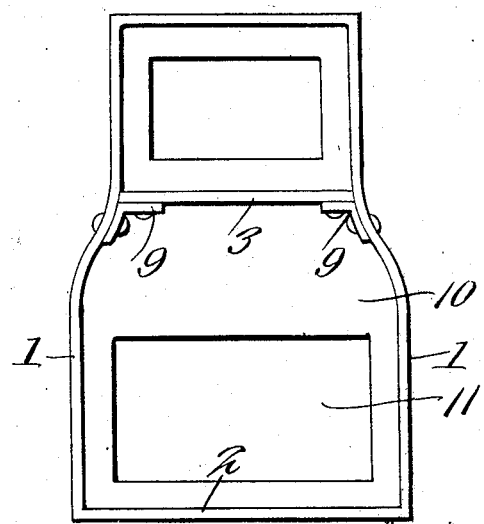
Witnesses:
Joe. P. Wahler.
John F. Byrne.
Inventor,
Lloyd Yeager Jr.
By Victor J. Evans
Attorney

UNITED STATES PATENT OFFICE.

LLOYD YEAGER, JR., OF CATAWISSA, PENNSYLVANIA.

CAR-STEP.

No. 919,278.   Specification of Letters Patent.   Patented April 20, 1909.

Application filed August 21, 1908. Serial No. 449,649.

*To all whom it may concern:*

Be it known that I, LLOYD YEAGER, Jr., a citizen of the United States, residing at Catawissa, in the county of Columbia and State of Pennsylvania, have invented new and useful Improvements in Car-Steps, of which the following is a specification.

My invention relates to improvements in car steps, and its primary object is the provision of a simple, durable and efficient device of this character which is especially designed for use on freight cars, cabooses, engines and engine tenders, the invention comprehending a car step which can be manufactured at a low cost, and which can be readily and quickly secured in applied position.

With the above and other objects in view, the invention consists in the construction, combination and arrangement of parts hereinafter fully described, claimed and illustrated in the accompanying drawings, wherein:

Figure 1 is a view in side elevation, illustrating the application of my improved car step to one end of a freight car. Fig. 2 is a perspective view of a modified form of the car step. Fig. 3 is a view in side elevation thereof. Fig. 4 is a view in side elevation illustrating a slightly modified construction in the sides of the car step. Fig. 5 is a perspective view of another modified construction of the car step. Fig. 6 is a view in front elevation of a further modified construction of the car step. Fig. 7 is a sectional view taken on a plane extending centrally and vertically through the car step illustrated in Fig. 6, and Fig. 8 is a perspective view of a still further modified construction of the car step.

Referring to the drawings by reference numerals, 1 designates the sides, 2 the lower tread, 3 the upper tread, and 4 the attaching element of my improved car step, the sides, lower tread and attaching element being preferably formed integrally. The sides 1 are increased laterally at 1ª to permit the lower tread to be made larger than the upper tread, whereby to facilitate the mounting of the step while the car is in motion. The lower tread is provided with openings, to receive elements by which a suitable non-slipping surface 5 is secured to the tread. The attaching element 4 is provided with openings 6 through which passes the elements by which the step is secured in applied position.

The upper tread 3 projects in advance of the lower tread and may be secured to a support which consists of a plate 7 extending from one side of the car step to the other and preferably formed integrally therewith, as fully disclosed in Fig. 2 of the drawings.

The lower tread 2 and the anti-slipping surface 5, are formed to provide openings 5ª which prevents the accumulation of water on the tread. This tread 2 may be secured to supports which consist of flanges 8 extending inwardly from and formed integrally with the sides 1 of the step, or it may be secured to supports which consist of angle irons 9 which are secured to the inner surfaces of the sides 1, as fully disclosed in Figs. 5 and 6, respectively. It will be seen from these figures of the drawings, that the lower tread must project in advance of the upper tread. The step also comprises a back 10 which is provided with openings 11 and 12, and which is preferably formed integrally with the sides 1, the lower tread 2 and the attaching element 4. The openings 11 and 12 are respectively arranged above the treads 2 and 3 to permit any snow which might have accumulated on the treads to be discharged therefrom in the mounting of the step. The sides 1 of the step may have any edge configuration, such configuration being disclosed in Figs. 3 and 4 of the drawings.

By reference to Fig. 1 of the drawings, it will be noted that the lower portions of the sides of the step may be curved laterally in the same direction to dispose the lower tread 2 at a safe distance from the rear wheels of the freight car.

In Fig. 8 of the drawings, I have disclosed a step which comprises sides 13, tread 14, attaching element 15 and a back 16, all formed integrally. The sides 13 are enlarged laterally adjacent the tread 14 to facilitate the mounting of the step, and the back 16 is provided with an opening 17 to permit the snow accumulating on the tread to be ejected therefrom during the mounting of the step. The tread 14 is provided with openings 18 to permit the passage of elements adapted to secure a non-slipping surface to the tread. The member 15 is provided with openings 19 to permit the passage of means adapted to secure the step in applied position.

It should be apparent from the above description, taken in connection with the accompanying drawings, that I provide a car step which is simple, durable and efficient, which may be manufactured and sold at a comparatively low cost and which is admirably adapted for the purpose for which it is intended.

Changes in the form, proportions and minor details of construction may be made within the scope of the claims without departing from the spirit or sacrificing any of the advantages of the invention.

Having fully described and illustrated my invention, what I claim is:—

1. A car step comprising sides, a lower tread formed integrally with the sides, an attaching element formed integrally with the sides, supports carried by the sides, an upper tread secured to the supports, and a back formed integrally with the sides, lower tread and attaching element, said back being provided with openings respectively located above the lower and upper treads.

2. A car step comprising sides, a tread formed integrally with the sides, an attaching element formed integrally with the sides, and a back formed integrally with the sides and tread and attaching element, the back being provided with an opening located above the tread.

3. A car step comprising sides, a lower tread formed integrally with the sides, an attaching element formed integrally with the sides, an upper tread secured to the sides between the lower tread and the attaching element, and a back formed integrally with the treads and sides and attaching element, said back being provided with openings respectively, located above the treads.

4. A car step comprising sides, a lower tread formed integrally with the sides, and an upper tread carried by the sides, the sides being curved laterally in the same direction below the upper tread.

In testimony whereof I affix my signature in presence of two witnesses.

LLOYD YEAGER, JR.

Witnesses:
L. W. WINTERSTEEN,
WM. H. YEAGER.